Patented Sept. 13, 1938

2,129,649

UNITED STATES PATENT OFFICE 2,129,649

PRODUCTION OF LIQUID HYDROCARBONS FROM GASEOUS OLEFINES

Thomas Cross, Jr., and Stewart C. Fulton, Elizabeth, N. J., assignors to Standard Oil Development Company, a corporation of Delaware No Drawing. Application October 7, 1936, Serial No. 104,439

7 Claims. (Cl. 196—10)

The present invention relates to the polymerization of normally gaseous olefines into materials of higher molecular weight, particularly to hydrocarbons boiling within the gasoline range. More specifically, the present invention is directed to the catalysis of such polymerizations.

According to the present invention, normally gaseous olefines, such as ethylene, propylene and butylene, are polymerized at temperatures ranging between 200 and 400° C. under atmospheric or superatmospheric pressure by the action of catalysts prepared by impregnating acid silica gel with a salt of a metal of Group II of the periodic system and a salt of a metal of Group III of the periodic system and leaching out of the silica gel the acid radical of the salts adsorbed thereon. It is assumed that the metals of the second group and of the third groups are present in the catalyst as oxides, and in the description and claims they will be referred to as oxides.

The catalysts employed according to the present invention are, in general, prepared by precipitating silica gel from water glass diluted with an equal volume of water by the addition of 2–8N.HCl, washing the precipitate free from chlorides, then treating the gel so produced with a dilute solution of the salts to be adsorbed thereon for an extended period of time, preferably at an elevated temperature, such as on a water bath, removing the gel from the solution, washing it carefully to eliminate acidity, filtering it and drying it at an elevated temperature insufficiently high to destroy the gel structure, generally in the neighborhood of 200° C. The amount of salt so adsorbed on the gel varies from 0.5% to about 3% by weight, and is usually of the order of 1% by weight.

As specific examples of the mixed catalyst contemplated for use by the present invention are cadmium oxide and alumina on silica gel, zinc oxide and alumina on silica gel, beryllia and alumina on silica gel, beryllia and boric oxide on silica gel, baria and lanthanum oxide on silica gel, cadmium oxide and lanthanum oxide on silica gel, cadmium oxide and thallium oxide on silica gel, and strontium oxide and alumina on silica gel. Of these, the preferred combinations are cadmium oxide and alumina on silica gel and zinc oxide and alumina on silica gel. Present information indicates that combinations containing magnesia, lime and mercury oxide are less effective than those above enumerated, although they do exhibit some activity. Compounds of radium have not been tried in any of these mixed catalysts, and for the purpose of the present invention, radium is not included among the metals of Group II of the periodic system.

Among the hydrocarbons which may be treated according to the present invention are pure olefines, such as propylene and butylene derived by dehydration of the corresponding alcohols, naturally occurring gases containing $C_2$, $C_3$ and $C_4$ olefines, the concentration of which may be increased by catalytic dehydrogenation or cracking, and refinery gases containing $C_2$, $C_3$ and $C_4$ olefines. Where the initial material is a mixed gas, such as refinery or natural gas, it is desirable to subject the gas to fractionation so as to concentrate $C_3$ and $C_4$ hydrocarbons and increase conversion per pass. Satisfactory conversions are obtainable at atmospheric pressure. Higher conversions are obtainable at elevated pressures, such as pressures in excess of 100 lbs./sq. in. and preferably of the order of 200–500 lbs./sq. in. Increased pressure makes it possible to operate at lower temperatures within the range indicated.

These catalysts suffer a loss of activity with extended use, but may be reactivated in situ by including in the feed a very small percentage of a hydrogen or alkyl halide, such as methyl, ethyl, isopropyl, butyl or similar chloride. The percentage of the activating agent added may, in general, vary from 0.2% to 2 or 3% of the feed. In some cases activity of the catalyst may be sustained by adding a small per cent of steam to the feed. The purpose of the steam is to make up for any loss of chemically bound water in the silica gel, it having been found that a loss of water of hydration in the silica gel reduces the activity of the catalysts.

The apparatus employed for carrying out the process of the present invention is simple in construction, consisting merely of a reaction tube preferably composed of a material such as quartz, silica or nichrome steel, which does not catalyze the decomposition of hydrocarbons to carbon and hydrogen, and packed with the catalyst which is in granular or molded pill form. The reaction tube may be heated in a conventional manner, such as by electrical resistance. For insurance of constant temperature, the tube may be imbedded in a heated metal block or in a molten metal or other liquid heating medium. The amount of heat which must be supplied to the reaction chamber is usually not very great since the reaction is exothermic. When the olefine concentration of the feed stock is very high, it may be necessary at times to withdraw heat from the reaction chamber so as to maintain the desired temperature. When the feed stock is obtained by dehydration of alcohol over a dehydration catalyst, such as bauxite, at about 400° C., the polymerization tube may be connected in series with the dehydration chamber so that the heat contained in the gases leaving the dehydration chamber can be utilized.

The process of the present invention will be better understood from the following specific examples which demonstrate the catalytic effect of typical mixtures of the group previously enumerated. In these examples, the value given for catalytic activity designates the grams of polymer formed per gram of catalyst per hour.

Example 1

To 400 ccs. of a 40 Bé. solution of sodium silicate was added 3N.HCl in a quantity sufficient to precipitate a gel. The gel so produced was filtered and washed free of chloride. To the gel was added a solution of 100 grams of $Al_2(SO_4)_3.18H_2O$ and 50 grams of $Cd(NO_3)_2$ in 1000 ccs. of water. The mixture was allowed to stand on a water bath for three hours and was then filtered, and dried at 220° C.

Propylene obtained by dehydration of isopropyl alcohol over bauxite at a temperature ranging between 300 and 410° C. was passed over 47 grams of the above catalyst at a temperature which varied between 235° C. and 275° C. and at atmospheric pressure. In the course of 5 hours 1.9 cu. ft. of feed stock were passed over the catalyst at a fairly uniform rate.

35 grams of polymer boiling within the gasoline range was obtained. The activity of the catalyst was .15.

Example 2

The catalyst was prepared according to the method described in Example 1, with zinc sulphate substituted for cadmium chloride.

Propylene was passed over 76 grams of this catalyst at an average temperature of 300° C. In the course of 4½ hours 2.6 cu. ft. of feed were passed over the catalyst, yielding 67.5 grams of liquid polymer. The catalytic activity was .20.

Example 3

A catalyst was prepared by precipitating silica gel from 500 ccs. of a 40 Bé. $Na_2SiO_3$ solution by the addition of 5N.HCl. The gel was washed free of chlorides and was then mixed with 225 ccs. of a 0.2 normal solution of $Al_2(SO_4)_3 18H_2O$. The mixture was allowed to stand on a steam bath for several hours and was then carefully washed until the wash liquid gave no acid reaction. The catalyst was then dried at 220° C. The resulting mixture contained 70.94% $SiO_2$ and 1.98% $Al_2O_3$. In the course of 5 hours 2 cu. ft. of propylene were passed over 60 grams of this catalyst under the conditions set forth in the preceding example. 27.4 grams of liquid polymer were produced. The activity of the catalyst was .091.

Example 4

In another run 4 cu. ft. of propylene were passed over 93 grams of the catalyst described in the last example at an average temperature of 250° C. in the course of 385 minutes. 64.5 grams of polymer were produced. The activity of the catalyst was .106.

It can be seen from the above examples that a mixture of an oxide of a metal of Group II with an oxide of a metal of Group III of the periodic system on silica gel is a more active catalyst than an oxide of a metal of Group III itself on silica gel. The superiority shown for zinc and cadmium oxides in combination with alumina on silica gel over alumina itself on silica gel holds true, in general, for other combinations of metal compounds of Group II with alumina and other metal compounds of Group III.

Whether or not a catalyst is effective in this reaction can be demonstrated qualitatively by arranging the catalyst in the reaction chamber and causing the effluent gases to pass thru a receiver cooled sufficiently to condense gasoline polymers. Accordingly, it was not necessary to conduct quantitative experiments with all of the specific catalysts mentioned. It may be stated, however, that present indications are that the specific catalysts for which a preference has already been expressed are the more effective of the specific catalysts enumerated.

In practical operation, recycling of the unconverted feed stock after separation of the polymers formed is advisable. This process may be advantageously combined with a catalyst dehydrogenation of gaseous paraffins as well as with the dehydration of the corresponding alcohols. When dehydrogenation of gaseous paraffins is the first step, the unconverted feed leaving the polymerization chamber may be recycled directly to the dehydrogenation unit if its content of olefines is substantially consumed, or it may be sent directly to a thermal polymerization unit operated under conditions suitable for the conversion of gaseous paraffins to liquid products, that is, at a temperature in excess of about 900° F. and under a pressure of about 500 lbs./sq. in., usually about 1000 to 2000 lbs./sq. in.

The nature and objects of the present invention having been thus described and illustrated by preferred embodiments of the same, what is claimed as new and useful and desired to be secured by Letters Patent, is:

1. A process for the conversion of normally gaseous olefines into higher boiling polymers, which comprises contacting said olefines with a catalyst, the essential catalytic constituents of which are a minor proportion of a oxide of a metal of Group II of the periodic system selected from the group consisting of zinc and cadmium and a minor proportion of a compound of a metal of Group III of the periodic system associated with a major portion of silica gel, under polymerizing conditions adapted to maintain the gel structure.

2. Process according to claim 1, in which the catalyst comprises zinc oxide, alumina and silica gel.

3. Process according to claim 1, in which the catalyst comprises cadmium oxide, alumina and silica gel.

4. Process according to claim 1, in which the process is operated under superatmospheric pressures.

5. Process according to claim 1, in which the pressure is in excess of 100 lb./sq. in.

6. A process for the conversion of normally gaseous olefines into higher boiling polymers, which comprises contacting said olefines with a catalyst, the essential catalytic constituents of which are a minor proportion of an oxide of a metal of Group II of the periodic system selected from the group consisting of zinc and cadmium and a minor proportion of alumina associated with a major proportion of silica gel and maintaining a temperature of about 200° to 400° C.

7. A process for the conversion of normally gaseous olefines into higher boiling polymers, according to claim 6 in which the proportions of the oxide of the metal of Group II of the periodic system and alumina is about .5% to 3%.

THOMAS CROSS, Jr.
STEWART C. FULTON.